July 12, 1932. W. S. BAYLIS 1,866,590
TREATMENT OF LUBRICATING OILS WITH AN ACTIVATED CLAY AND WATER
Filed March 17, 1928
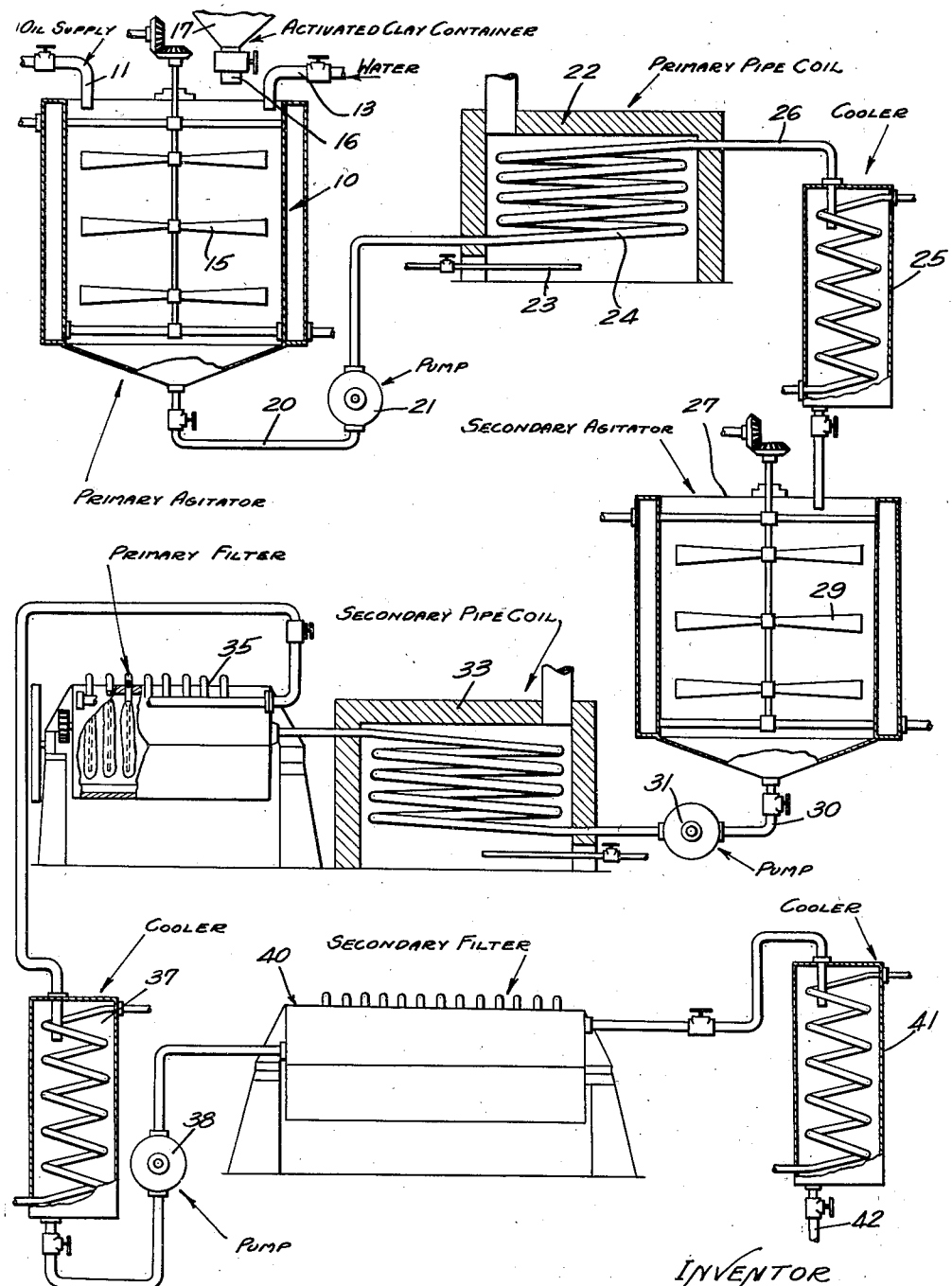
INVENTOR
WALTER S. BAYLIS
By
Fred W. Lawie
ATTORNEY Patented July 12, 1932

1,866,590

UNITED STATES PATENT OFFICE

WALTER S. BAYLIS, OF LOS ANGELES, CALIFORNIA, ASSIGNOR, BY MESNE ASSIGN-MENTS, TO FILTROL COMPANY OF CALIFORNIA, OF LOS ANGELES, CALIFORNIA, A CORPORATION OF CALIFORNIA

TREATMENT OF LUBRICATING OILS WITH AN ACTIVATED CLAY AND WATER

Application filed March 17, 1928. Serial No. 262,501.

My invention relates to the art of treating oil with adsorptive clays for the purpose of removing impurities from the oil and improving its color and odor. It is particularly applicable to the treatment of lubricating oils produced from petroleum, and in the following description I shall confine myself to the treatment of such an oil, although my invention is equally applicable to the treatment of other petroleum oils.

In the formation of high-grade lubricating oils from crude oil, it is customary to distill off various cuts or fractions of low boiling-point. Subsequently the heavier fractions of higher boiling-point are driven off, usually under vacuum, and are suitably condensed. The condensates require further treatment before they can be marketed as a high-grade lubricating oil, and it is to these steps of refining that my invention particularly relates. Acid is usually used in this refining and the acidified oil is usually neutralized by adding a caustic thereto. My process is applicable to the oil either before or after neutralization. The neutralized oil is usually of a very dark color, and it is possible to lighten this color in some instances by treating the oil with fuller's earth or other types of adsorbent clay. By the use of a chemically activated clay of the smectite or bentonite type, it is possible to reduce this color to 350 on the Lovibond scale.

I have found that by adding a small percentage of water (5% by weight in this particular illustration) to the oil before treatment with activated clay, it is possible to bring the color to 260 Lovibond. A slightly larger percentage of water will sometimes give even better results.

I have found it economical and convenient to carry out my process in a plant such as is diagrammatically outlined in the accompanying drawing. My process will be described with particular reference to this apparatus without particularly limiting myself thereto.

The oil to be treated is introduced into a primary agitator 10 by means of a supply pipe 11. As previously mentioned, this oil may be either an acid-treated lubricating oil or such an oil which has been neutralized by the treatment with caustic or by any other method or other petroleum oils. A small percentage of water is added to this oil through a pipe 13. The amount of water necessary will depend upon the type and characteristics of the oil to be treated and upon the result to be finally obtained. Thus, I am not able to specify any given percentage of water which will meet all requirements. It is true, however, that, within limits, the larger this percentage of water the lighter the resulting color will be. These limits usually range from less than one per cent to in the neighborhood of fifteen per cent by weight. I have found it practical to add five per cent by weight of water, or slightly more, to a neutral lubricating oil when this oil is treated on a commercial scale in large quantities.

The primary agitator 10 is equipped with paddles 15 which may be rotated by means, not shown, to agitate the mixture therein. Thus, the water and oil may be brought into intimate contact so that the whole body of oil is acted upon.

The desired amount of activated clay is then added to the mixture through a spout 16 of a container 17. This activated clay is preferably one having high adsorptive properties. The amount of activated clay required will depend almost entirely upon the final color which it is desired to obtain, the more activated clay, the lighter the color obtained (within limits), but the type of oil will also change the amount needed. Furthermore, the amount of water previously mixed with the oil has a direct bearing on the amount of activated clay used, for the addition of water to the oil reduces the amount of activated clay necessary, this reduction increasing as the percentage of water in the oil is increased. The percentage of adsorptive clay is, however, small, usually being between three and ten per cent by weight, although these limits are not conclusive.

The mixture of oil, activated clay, and water is agitated in the primary agitator 10 until a thorough intermixture is effected. During this intermixture a large part of the water is absorbed by the activated clay. The mixture is then withdrawn from the primary agitator 10 through a pipe-line 20 in which a pump 21 is placed, this pump forcing the mixture into and through a primary heating coil 22. The heating coil chamber may be of conventional design having tubes 24 through which the mixture is forced. The space surrounding the tubes 24 is heated by steam or other means, for example, burner 23, this heat being conducted through the walls of the tubes 24 and being effective in raising the temperature of the mixture passing therethrough. The temperature to which I prefer to raise the mixture in the primary heating coil 22 is not critical but may be varied over wide limits, but I find as a general rule that the best results are secured by raising the temperature to a point slightly below the flash of the oil. The high temperature and pressure in the primary heating coil, and any vaporization of the water that takes place therein, aid in decomposing the products of acid refining and materially aid the action of the activated clay on the mixture, this action being a decolorizing and purifying one.

After the mixture leaves the heating coil, it is passed through a cooler or heat-exchanger 25 through a pipe-line 26. This mixture is cooled in the cooler 25 and the mixture is then passed into a secondary agitator 27, similar to the primary agitator 10, where it is further agitated by paddles 29 and allowed to cool still further. The moisture in the mixture is vented at any point after leaving the primary heating coil 22.

When the pressure on this mixture is reduced, any water which was not previously vaporized will immediately form into a vapor and will separate from the mixture. The vapor carries therewith certain impurities in the oil and has a peculiar effect in allowing the powerful action of the activated clay to be further used in the secondary agitator 27. The temperature of the mixture in the secondary agitator is preferably kept above the boiling-point of water for a sufficient length of time to insure that all of the water has been driven off, this action being made possible by the rotation of the paddles 29 which thoroughly stir up the mixture in the secondary agitator 27. More activated clay may be added at this point if desired, with or without removal of the first supply. Agitation is continued until the temperature of the mixture is materially reduced, ordinarily to a point below the boiling-point of water although this temperature is not essential.

A pipe-line 30 communicates with the secondary agitator 27, and a pump 31 in this pipe-line is adapted to force the mixture into and through a secondary heating coil 33 which may be identical in construction with the primary heating coil 22, being heated by steam or other means. This secondary heating coil is adapted to reheat the mixture and reduce the viscosity thereof so that the oil will readily filter when forced through a primary filter 35. The primary filter may be of any type which will effectively separate the activated clay from the oil. I prefer to use a filter of the continuous vacuum type, although this use is only one of convenience and I am not limited to the use of this particular type of filter. The activated clay collects on the drum of the filter and is continuously scraped off. The advantage of using the continuous vacuum type of filter is that the amount of oil retained in the cake is usually less than where a pressure filter is employed, and the operating labor is less, as the press does not require cleaning. In this operation it is not necessary to dilute prior to filtration, therefore the oil can readily be recovered from the cake by extraction, the extracted cake reactivated and again utilized in purifying and decolorizing the lubricating oil. The oil passing through the primary filter may be cooled, if so desired, in a cooler or heat-exchanger 37, and a pump 38 forces this oil through a secondary filter 40 which is adapted to remove all traces of fines which might be passed by the primary filter. This secondary filter is preferably of the blotter type. After leaving the secondary filter the oil may be still further cooled in a cooler 41 and passed through a pipe 42 to a suitable storage, or to a de-waxing plant in the case of certain types of lubricating oils.

I have found that the use of two heating coils and two agitators allows an intermediate cooling of the mixture to take place, this intermediate cooling giving results unobtainable by a single heating of the mixture and subsequent filtration. This intermediate cooling also gives the moisture in the mixture a chance to vaporize and carry with it certain impurities in the oil. The mixture of activated clay and oil in the secondary agitator 27 is particularly effective in decolorizing the oil and producing a product otherwise unobtainable.

The temperatures maintained in the primary and secondary heating coils and those to which the mixture is reduced in the coolers 25, 37, and 41, are not critical. As previously mentioned, the primary heating coil 22 preferably raises the temperature to a point just below the flash of the oil. In a particular instance this temperature might be 500° F. With such a temperature, it is preferable to cool the oil to a temperature of around 300° F. in the cooler 25, so that the mixture is still above the boiling-point of water when it reaches the agitator 29 and is subjected to atmospheric pressure. Agitation of the mixture is effected in the secondary agitator 27 until the temperature thereof is materially reduced, this temperature being in no way critical except that it is preferable to cool the mixture below the boiling-point of water before passing it through the pipe-line 30.

The temperature to which the mixture is raised in the secondary heating coil will depend entirely upon the type of oil used and upon the ability of the primary filter to handle the viscous oils. This temperature is reduced in the cooler or heat-exchanger to a substantially lower degree which raises the viscosity of the oil to a point at which this oil may be conveniently handled by the blotter filter press 40. The cooler 41 reduces this temperature to that temperature desired in the storage tank or any subsequent apparatus through which the oil may pass.

It is sometimes useful to introduce steam into the pipe-line 20, this steam raising the temperature of the mixture and combining therewith.

It is also desirable to have sufficient capacity in the primary and secondary agitators so that the process may be a continuous one. This is most easily accomplished by providing a number of agitators instead of the single unit shown in each primary and secondary group.

The phrase "approximately complete decolorization of the oil" as used in the appended claims is to be interpreted as the maximum decolorization commercially obtainable with the amount of decolorizing clay used under the range of conditions defined in the specification.

I claim as my invention:

1. A method of improving the color in lubricating oils, which consists in: adding a small percentage of water to said oil; agitating said oil and said water; adding an activated clay to said oil and said water; agitating the mixture of said oil, water and activated clay; heating said mixture under pressure to a temperature below the flash point of said oil, said temperature being maintained for a sufficient period for only a partial improvement of the color of the oil to take place; adding additional activated clay; again agitating said mixture until the improvement of the color of the oil is complete; and filtering said mixture to separate said activated clay and said oil.

2. A method of improving the color of lubricating oil, which consists in: adding a small percentage of water to said oil; adding an activated clay to said oil; agitating the mixture of said oil, water and activated clay; heating said mixture under pressure to a temperature slightly below the flash point of said oil, said temperature being maintained for a sufficient period for only a partial decolorization of the oil to take place; venting said mixture to remove the water vapor; cooling the remaining mixture; adding additional activated clay agitating the remaining mixture until approximately complete decolorization of the oil takes place; and filtering said mixture to separate said oil from said clay and the impurities associated therewith.

3. A method of improving the color of lubricating oils, which consists in: adding 1% to 15% of water to said oil; adding 3% to 10% of an activated clay to said oil; agitating the mixture of said oil, water and activated clay; heating said mixture under pressure to a temperature slightly below the flash point of said oil, said temperature being maintained for a sufficient period for only a partial decolorization of the oil to take place; venting said mixture to remove the water vapor; cooling the remaining mixture; adding additional activated clay agitating the remaining mixture until approximately complete decolorization of the oil takes place; and filtering said mixture to separate said oil from said clay and the impurities associated therewith.

4. The method of improving the color of lubricating oils, which consists in: producing a thorough intermixture of the oil to be treated with a small amount of water and with an adsorptive clay; heating said mixture under pressure to a temperature slightly below the flash point of said oil, said temperature being maintained for a sufficient period for only a partial improvement of the color of the oil to take place, without oxidizing said oil; venting said mixture to remove the water vapor; reducing the pressure of the remaining mixture; adding additional activated clay agitating said remaining mixture until the improvement of the color of said oil is approximately complete; and thereafter separating said clay from said oil.

In testimony whereof, I have hereunto set my hand at Chicago, Illinois, this 9th day of March, 1928.

WALTER S. BAYLIS.